Dec. 16, 1969     J. J. SMORENBURG     3,483,589
INSTALLATION FOR PLUCKING POULTRY
Filed Dec. 1, 1966     3 Sheets-Sheet 2
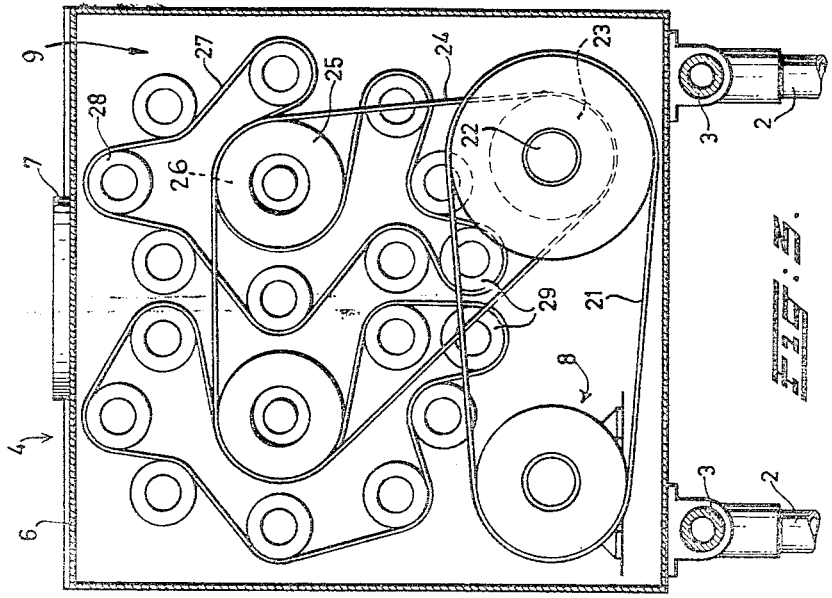
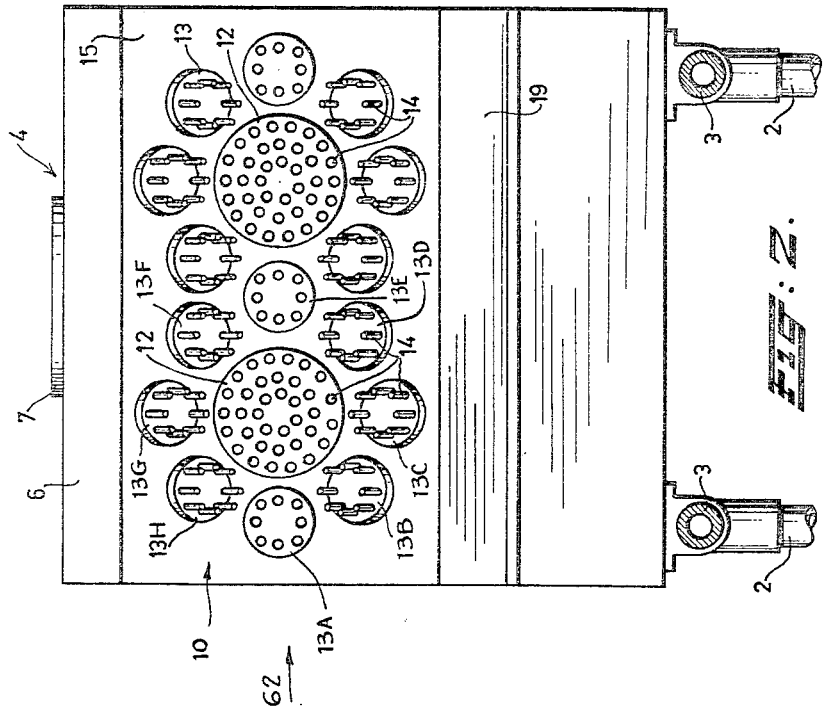
INVENTOR.
JOHANNES J. SMORENBURG
BY
ATTORNEYS

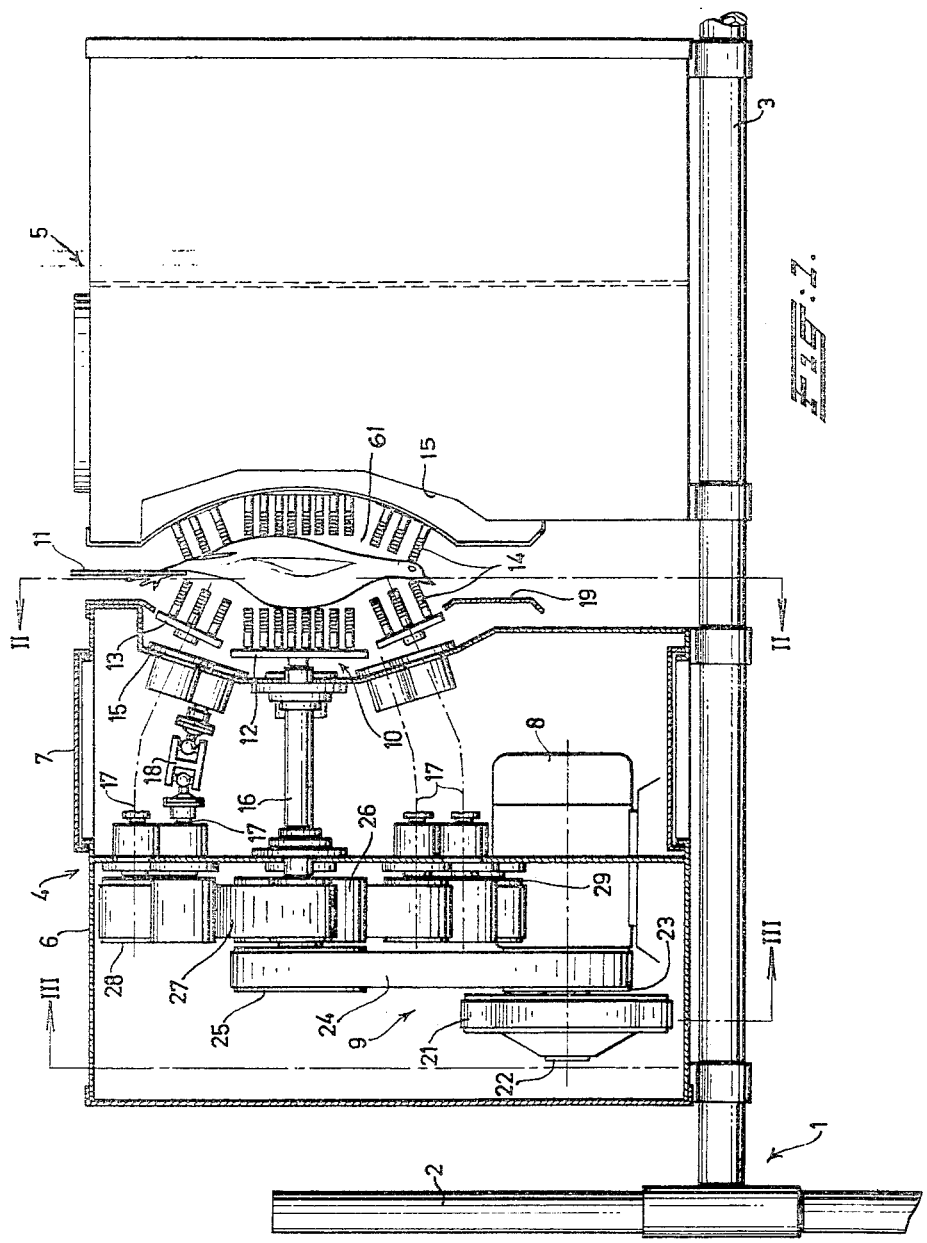

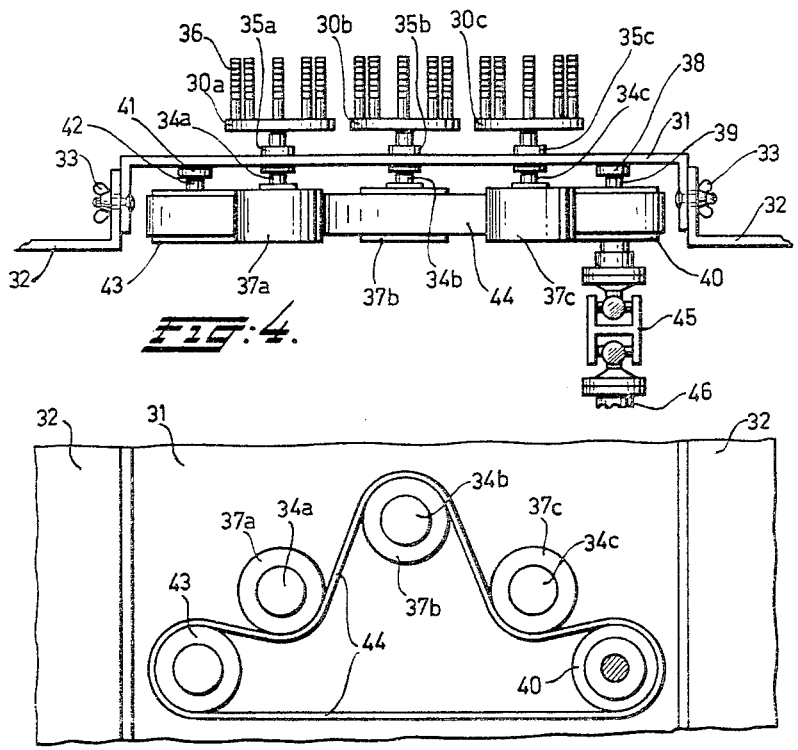

United States Patent Office 3,483,589
Patented Dec. 16, 1969

3,483,589
INSTALLATION FOR PLUCKING POULTRY
Johannes J. Smorenburg, Abcoude, Netherlands, assignor to Gebr. Stork & Co's Apparatenfabriek N.V., Amsterdam, Netherlands, a corporation of the Netherlands
Filed Dec. 1, 1966, Ser. No. 598,325
Claims priority, application Netherlands, Dec. 9, 1965, 6515996
Int. Cl. A22c 21/02
U.S. Cl. 17—11.1                                    8 Claims

ABSTRACT OF THE DISCLOSURE

Installation for plucking poultry, comprising a rotating central member surrounded by a number of rotatable outer members, all being provided with plucking fingers directed transverse to the surface of the poultry.

---

My inventon relates to a device for plucking poultry, comprising at least one movable plucking unit, which on at least one side is provided with a number of protruding plucking fingers, means being provided for conveying the plucked poultry in a path along the effective side of each plucking unit. A wide range of embodiments of such devices are known in which, however, the effect of the plucking is not satisfactory in every respect. So on the one hand there is a risk that the poultry is too roughly handled, owing to the fact that the action of the plucking fingers is too intensive and too great forces are exerted on the poultry so that injuries occur. If on the other hand the forces exerted on the poultry are reduced the occurrence of injuries is indeed avoided but the plucking effect decreases.

It is an object of my invention to provide an installation with which an intensive plucking effect can be obtained without the risk of too great forces being exerted on the poultry. To this end each plucking unit consists of a movable central part with movable outer members disposed therearound in a ring shaped, configuration which assume such a position that the plucking fingers are substantially directed transverse to the surface of the poultry to be treated, whereby the ends of the plucking fingers define a surface having a shape which approximately corresponds with the longitudinal profile of the poultry.

It has been experimentally found that it is advantageous when each outer member is rotatable around its own axis. These outer parts act substantially upon the less accessible parts of the poultry and, due to the individual rotation of the outer members an intensive plucking effect is locally obtained while no disturbing forces are produced.

It is a further object of my invention to provide an installation in which a strong stabilizing effect on the poultry is produced due to the fact that the outer members are arranged in a ring shaped configuration, so that the treated poultry does not tend to swing to the extent as is experienced in the known installation when a part of the outer members belonging to a plucking unit are driven in an opposite direction in respect of the other outer members of the same unit. This stabilizing effect is of very great importance for the usefulness of the installation and for the quality of the delivered product.

In order to allow for the proper accessibility to the back side of both the central part and the outer members it is advantageous that they are arranged in spaced relationship from the wall of the plucking space. This may entail the risk that parts of the poultry to be plucked land in this intermediate space.

Another aim of my invention is to provide an installation in which each outer member is preferably driven by a shaft with a universal joint. This makes it possible to easily adjust the position of each outer member to the profile of the poultry to be plucked, while simple common drive means may be used.

My invention also aims to provide an embodiment in which a number of outer members are supported by a common carrier, of which the position in respect of the central part can be adjusted at will. Furthermore a part of these members can be driven at a speed and in a direction which differ from that at and in which the other members are driven.

For that purpose each outer member is secured on a shaft supported in the carrier and carries a pulley which, together with the pulleys of the other shafts, can be driven via a driving belt. The diameter of the driving pulley of a part of the members may differ from that of the other members.

In the aforementioned embodiments the position of the member is destined by the position of its driving shaft. Another aim of my invention is to obtain a connection between a number of or all outer members and the respective shafts in such a way that in operation the axis of the member is always in a position to adjust itself perpendicular to the surface to be acted upon. For that purpose at least a number of the outer members can be connected, via a universal joint and a springloaded sliding coupling which is movable in an axial direction, with the respective driving shafts. The embodiment is moreover advantageous in that the plucking fingers are always in touch with the poultry.

A more complete understanding of my invention, and of further objects and features thereof can be obtained from the following description of illustrative embodiments thereof, when considered in connection with the accompanying drawing, wherein:

FIGURE 1 shows at its left half a vertical section through the installation in a plane transverse to the direction of transport of the poultry to be plucked and at its right half a side view of the installation;

FIGURE 2 is a view according to the line II—II in FIGURE 1 of the left half of the installation depicted in FIGURE 1;

FIGURE 3 is a view according to the line III—III in FIG. 1;

FIGURE 4 shows a plan view of a number of outer members supported by a carrier;

FIGURE 5 is an inverted plan view of the carrier and represents the drive of the members;

FIGURE 6 is a side elevation of a member driven via a universal joint and a sliding coupling.

The installation comprises a frame 1 consisting of uprights 2 and horizontal girders 3. The plucking part proper consists of two substantially identical assemblies 4 and 5 which are slidably mounted on the girders 3, which on their turn can slide along the uprights 2. Each assembly 4, 5 consists of a housing 6 with a trap-door 7 for inspection. Accommodated in the housing 6 is a motor 8 with drive means 9 connected to a movable plucking unit 10. Each assembly 4 and 5 has a plucking unit 10 thereon, which plucking units 10 face opposite each other and define therebetween a space or passageway 61 which extends longitudinally (horizontally in the illustrated embodiment) of the installation. Provided above the passageway 61 between the two oppositely situated plucking units 10 (see FIGURE 1) are means 11 for transporting the poultry to be plucked along a path through the passageway 61 so that the effective side of each plucking unit 10 will contact the poultry, the direction of movement of the poultry through the passageway 61 being indicated by the arrow 62 in FIGURE 2.

As FIGURE 2 shows, each plucking unit 10 consists of at least one movable central member 12 with a plurality of rotatable outer members 13, provided therearound in a ring shaped configuration. FIGURE 2 illustrates that each plucking unit 10 can, if desired, be provided with a pair of central members 12 positioned adjacent each side of the passageway 61 and spaced longitudinally therealong, each member 12 having eight outer members 13 circumferentially spaced therearound. The members 13 surrounding one of the central members 12 have been designated 13A through 13H (FIGURE 3) for convenience in reference. Both the central part 12 and the eight outer members 13 arranged therearound are provided with a number of plucking fingers 14 which are best to be viewed in FIGURE 1. The outer members 13 assume a position such that the plucking fingers 14 are substantially directed transverse to the surface to be treated of the poultry (represented in solid lines in FIGURE 1). The ends of the fingers 14 thus define the sides of the longitudinally extending passageway 61 and an imaginary surface through the ends of the plucking fingers 14 has a shape which approximately corresponds with the longitudinal profile of the poultry.

In order to insure that a complete plucking or treatment of the poultry occurs as the poultry is carried longitudinally through the passageway 61 by the movable means 11, the central plucking member 12 and the outer plucking members 13 are positioned such that they overlap in a direction transverse to the longitudinal direction of the passageway 61 whereby the complete external profile of the poultry is contacted and treated by the plucking fingers as the poultry is moved longitudinally through the passageway 61. This overlap is shown in FIGURE 2 which illustrates the central member 12 and the opposite outer members 13C and 13G spaced apart in a direction transversely of the longitudinal direction of the passageway 61. Due to the transverse spacing between the central member 12 and the outer members 13C and 13G, small transverse spaces exist therebetween whereby portions of the poultry profile, when positioned directly adjacent the central member 12 and the outer members 13C and 13G, will not be contacted by the plucking fingers. Accordingly, the present invention positions further outer plucking members, such as the outer members 13B and 13H, so as to overlap with the central member 12 and the outer members 13C and 13G in a direction transversely of the longitudinal direction of the passageway 61. Thus, when the poultry moves through the passageway 61 in the direction 62, the poultry will be contacted and treated by the members 13B and 13H, which members will come in contact with the poultry in the spaces or areas which are not contacted by the members 12, 13C and 13G due to the transverse spacing therebetween. This transverse overlap between the plucking members thus results in the complete profile of the poultry being contacted by the plucking fingers 14 as the poultry moves in the direction 62 throughout the longitudinal passageway 61.

The central part 12 and the outer members 13 are rotatably supported in a set back wall 15 of the housing 6, the wall 15 being positioned adjacent one side of the passageway 61. The drive of the part 12 is effected via a shaft 16, the outer members being driven by means of shafts 17 (of which only one is represented in FIGURE 1) with a universal joint 18.

In order to allow for easy maintenance of the installation a certain intermediate space is provided between the central part 12 and the outer members 13 on the one hand and the set back wall part 15 on the other hand. There is further provided a saucer shaped screening plate 19, the surface of which is on level with the outer edge of the central part 12 and the outer members 13. This plate 19 can be easily detached and removed whereupon the space behind the members 12, 13 is accessible.

As FIGURE 3 shows the drive 9 consists of a variable speed device having a belt 21 through which a shaft 22 is driven at a desired speed. This shaft 22 is provided with a pulley 23 over which runs a belt 24 driving a pulley 25 of the plucking unit 10. This pulley 25 is fixedly secured on the shaft 16 of the central part 12. Mounted on the same shaft 16 in juxtaposition with the pulley 25 is a second pulley 26 over which a belt 27 is slung which runs over a number of small pulleys 28 mounted on the shafts 17. The belt 27 is slung around the pulleys in such a way that always two juxtaposed pulleys 28 are oppositely driven. This is illustrated in FIGURE 3 which also shows that in combination with the two depicted belts 27 also an idle pulley 29 is used. This simple and also dependable drive ensures that the outer members 13 associated with a plucking unit 10 turn for a part to the left and for the rest to the right, which has a specially stabilizing effect on the position and the movements of the poultry to be plucked.

It should be noted that the center line or rotational axes of the central part 12 and the outer members 13 and 13E are situated in the same horizontal plane, being substantially perpendicular to the longitudinal direction of passageway 61, whereas the rotational axes of the outer members 13 situated above (13F–13H) and below (13B–13D) the central part 12 are inclined relative to the horizontal plane as is apparent from FIG. 1. This orientation causes plucking members 14 to extend substantially transversely to the surface to be treated of the poultry, a surface through the ends of the plucking members 14 having a shape which approximately corresponds with the longitudinal profile of the poultry.

In the embodiment described hereinbefore the outer members 13 rotate around their own axes. However, the outer members 13 could if desired be driven with an oscillatory motion about their axes instead of rotation.

As well readily be appreciated the central part 12 is substantially active for plucking the trunk of the poultry, while the outer parts 13 perform plucking on the less accessible parts of the poultry as well as under the wings and between the legs. The swinging motion of the poultry which tends to occur in the known installations is prevented due to the stabilizing effect of the rotating outer members 13.

FIGURE 4 shows three outer members 30a, 30b, 30c provided on a common supporting plate 31, which in an adjustable way is secured to the supports 32 by the aid of the fastening bolts 33. The shafts 34a–34c of the members are supported in bearings 35a–35c which are secured to the common supporting plate 31. The members themselves are provided with plucking fingers 36. Each shaft 34a–34c carries a pulley 37a–37c; the supporting plate 31 carries furthermore a bearing 38 for the shaft 39 of a driving pulley 40 and a bearing 41 for the shaft 42 of the idler pulley 43. A driving belt runs over the pulley, as is shown in FIGURE 5, in such a way that the direction of rotation of the pulley 37b is opposed to the direction of rotation of the pulleys 37a and 37c. Obviously the pulleys can also all be driven in the same direction.

The pulley 40 is driven via a universal joint 45 coupled to the shaft 39, the universal joint being connected with the common driving shaft 46. If it is desired that the system of outer members 30a–30c should not only be adjusted in their angular position, but also in their spacing in respect of the poultry to be plucked a sliding coupling (such as coupling 51 illustrated in FIGURE 6) can be conveniently interposed between the universal joint 45 and the shaft 46, the said coupling allowing an axial movement of the shaft 39 in respect of the shaft 46. The holes in the angle pieces 32 through which the fastening bolts 33 protrude may be shaped as slits so that an axial movement of the carrier becomes possible.

In the aforementioned embodiments the outer members are fixedly secured to their respective shafts, so that the position of the shaft also determines the position of the member. It is, however, also possible to construct the connection between a number or all outer members and their respective shafts in such a way that in operation the center line of the member can make a certain angle with its driving shafts, so that the member is more or less self-adjusting and the center line of the member tends to adjust itself always in a direction perpendicular to the surface to be plucked.

FIGURE 6 shows an embodiment of a drive for the outer member wherein this possibility is materialized. Via the universal joint 49 the member 47 with the plucking fingers 48 is connected with the output shaft 50 of a sliding coupling 51 of which the input shaft 52, supported in the bearing 53, drives the output shaft 50 via the key ways 54. Due to the action of the spring 55 the member 47 is pressed leftwardly, so that the plucking fingers 48 contact the surface to be plucked with a certain pressure. When the member 47 is driven it will, when the plucking fingers are not in touch with the poultry, due to the centrifugal force, adjust itself in such a way that the center line of the member is coaxial with the center line of the driving shaft 52. The member can, however, deviate to all sides due to the universal joint 49 and also move over a limited distance in axial direction. In this way a proper adaption to the surface to be plucked is obtained and moreover it is ensured that the plucking fingers are always in touch with the surface to be treated.

What I claim is:

1. A device for plucking poultry, comprising:
   a frame means having a longitudinal passageway therein;
   a pair of plucking means rotatably mounted on said frame means and located, respectively, on opposite sides of said longitudinal passageway for contacting the complete longitudinal profile of poultry as the poultry is moved in a lengthwise direction through said longitudinal passageway;
   each of said plucking means including a rotatable central plucking member and a plurality of rotatable outer plucking members surrounding the central plucking member;
   each of said rotatable plucking members having plucking fingers mounted thereon and protruding outwardly therefrom toward said passageway, the ends of the plucking fingers defining the opposite sides of a zone having a shape substantially corresponding to the longitudinal profile of the poultry to be plucked;
   a first one of said outer plucking members being positioned adjacent one lengthwise extending edge portion of the passageway and a second one of said outer plucking members being positioned adjacent the opposite lengthwise extending edge portion of the passageway, the first and second outer plucking members each being mounted on said frame means for rotation about an axis which is inclined relative to the rotational axis of the central plucking member, and said central and outer plucking members being positioned to at least partially overlap in a direction transverse to the lengthwise direction of said passageway so that no longitudinally extending gaps are formed whereby the complete longitudinal profile of the poultry is contacted by the fingers.

2. A device according to claim 1, wherein said passageway extends substantially horizontally through said device, said first outer member being positioned above the central member adjacent the upper lengthwise extending edge portion of the passageway, the second outer member being positioned adjacent the lower lengthwise extending edge portion of the passageway on the side of the central member diametrically opposite the first outer member, said plucking means including a third outer plucking member positioned adjacent said central member and circumferentially spaced from said first outer member, said third outer member being positioned at an elevation between the central member and the first outer member for vertically overlapping same, said plucking means further including a fourth outer plucking member positioned adjacent said central member and circumferentially spaced from said second outer member, said fourth outer member being positioned at an elevation between said second outer member and said central member for vertically overlapping same.

3. A device according to claim 2, wherein said plucking means includes eight outer plucking members positioned in a uniformly spaced, circular arrangement around the periphery of the central plucking member.

4. A device according to claim 3, wherein the central plucking member is rotatable about a substantially horizontal axis, and wherein said eight outer plucking members include three uppermost outer plucking members rotatable about axes which are inclined relative to the rotational axis of the central member and three lowermost outer plucking members rotatable about axes which are inclined relative to both the axis of the central member and the axes of the three uppermost outer members.

5. A device according to claim 1, including means for rotating some of the outer members in an opposite direction of rotation with respect to the other outer members.

6. A device according to claim 1, wherein the frame means includes a carrier member which is adjustably positioned with respect to a stationary portion of the frame means, a plurality of outer members being mounted on the carrier for permitting simultaneous adjustment of the position of said plurality of outer members.

7. A device according to claim 6, including means for rotating a part of the outer members mounted on the carrier in a direction opposite the direction of rotation of the other outer members mounted on the carrier.

8. A device according to claim 1, wherein said frame means includes a carrier and each outer member is mounted on a shaft supported by the carrier, each shaft being provided with a pulley thereon, and driving means including a driving belt in engagement with said pulleys for rotating said outer members.

References Cited

UNITED STATES PATENTS

| | | | |
|---|---|---|---|
| 2,444,556 | 7/1948 | Drews | 17—11.1 |
| 2,571,034 | 10/1951 | Harvey | 17—11.1 |
| 3,197,809 | 8/1965 | Corn et al. | 17—11.1 |
| 3,235,904 | 2/1966 | Brown et al. | 17—11.1 |
| 3,273,198 | 9/1966 | Tomlinson | 17—11.1 |
| 3,277,515 | 10/1966 | Engkjer et al. | 17—11.1 |

LUCIE H. LAUDENSLAGER, Primary Examiner